(12) United States Patent
Prost et al.

(10) Patent No.: US 9,669,339 B2
(45) Date of Patent: Jun. 6, 2017

(54) IN-LINE MAGNETIC PARTICLE FILTER

(71) Applicant: SCHLUMBERGER TECHNOLOGY CORPORATION, Sugar Land, TX (US)

(72) Inventors: Jerome Prost, Houston, TX (US); Anthony Frank Veneruso, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 417 days.

(21) Appl. No.: 14/216,139

(22) Filed: Mar. 17, 2014

(65) Prior Publication Data
US 2014/0284282 A1    Sep. 25, 2014

Related U.S. Application Data

(60) Provisional application No. 61/804,102, filed on Mar. 21, 2013.

(51) Int. Cl.
| | |
|---|---|
| *B01D 35/06* | (2006.01) |
| *B03C 1/28* | (2006.01) |
| *B03C 1/00* | (2006.01) |
| *B03C 1/034* | (2006.01) |

(52) U.S. Cl.
CPC ............. *B01D 35/06* (2013.01); *B03C 1/002* (2013.01); *B03C 1/034* (2013.01); *B03C 1/288* (2013.01); *B03C 2201/18* (2013.01)

(58) Field of Classification Search
CPC ...... B01D 35/06; B03C 1/288; B03C 2201/18
See application file for complete search history.

(56) References Cited

U.S. PATENT DOCUMENTS

| | | |
|---|---|---|
| 3,170,871 A | 2/1965 | Moriya |
| 6,294,089 B1 | 9/2001 | Yeh |
| 6,706,178 B2 | 3/2004 | Simonson |
| 2005/0045537 A1 | 3/2005 | Imanse et al. |
| 2010/0294706 A1 | 11/2010 | Simonson |
| 2011/0094956 A1 | 4/2011 | Marchand et al. |
| 2011/0139722 A1 | 6/2011 | Simonson |

FOREIGN PATENT DOCUMENTS

JP    200380107 A    3/2003

OTHER PUBLICATIONS

Noria Corporation, "Applications and Benefits of Magnetic Filtration", Machinery Lubrication, Retrieved from http://www.machinerylubrication.com/Articles/Print/794, Sep. 2005, pp. 1-14.

*Primary Examiner* — David A Reifsnyder
(74) *Attorney, Agent, or Firm* — Michael Stonebrook

(57) ABSTRACT

A magnetic particle filter for a hydraulic control line is disclosed. A filter array is positioned to surround a portion of the hydraulic control line and includes alternating magnets and spacers having different interior diameters forming a ribbed interior surface. The corners between the spacers and magnets trap particles, magnetic and non-magnetic, thus removing them from the hydraulic control line.

20 Claims, 2 Drawing Sheets

IN-LINE MAGNETIC PARTICLE FILTER

CROSS-REFERENCE TO RELATED APPLICATIONS

This application claims priority to U.S. Provisional Patent Application No. 61/804,102 filed Mar. 21, 2013 entitled IN-LINE MAGNETIC PARTICLE FILTER which is incorporated by reference in its entirety.

BACKGROUND

This section provides background information to facilitate a better understanding of the various aspects of the disclosure. It should be understood that the statements in this section of this document are to be read in this light, and not as admissions of prior art.

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. One piece of equipment which may be installed is a hydraulic control system suitable to control various downhole deployed components. A hydraulic control system's reliability may be affected by any contamination found inside the hydraulic oil (e.g. hydraulic fluid or fluid) that operates the system.

SUMMARY

The present disclosure is directed to a particle filter for a hydraulic control line including a conduit for the hydraulic control line configured to permit hydraulic fluid to flow through the conduit, and a filter array having alternating magnets and spacers. The magnets create a magnetic field within the conduit that attracts particles toward the magnets to trap the particles against the filter array.

In further embodiments, the present disclosure is directed to a magnetic particle filter assembly for use with a downhole tool including a filter housing configured to house a hydraulic control line. The hydraulic control line is operably coupled to operate the downhole tool with selective application of hydraulic pressure. The assembly also includes a filter assembly within the filter housing and surrounding a portion of the hydraulic control line. The filter assembly includes a plurality of magnets having a first interior diameter through which the hydraulic control line passes, and a plurality of spacers having a second interior diameter through which the hydraulic control line passes, the second interior diameter being different than the first interior diameter. The spacers and magnets are spaced alternatingly to create a ribbed interior surface to the filter assembly. The assembly also includes a resilient shock-absorbing member configured to resiliently urge the magnets and spacers together and to absorb shock to the magnets and spacers. The filter assembly is configured to magnetically attract particles in the hydraulic control line and trap the particles against the filter assembly thereby preventing the particles from exiting the filter assembly.

In yet further embodiments, the present disclosure is directed to a method of filtering particles from a hydraulic fluid in a control line, including positioning a filter array relative to the hydraulic fluid line such that the hydraulic fluid passes through the filter array. The filter array has alternating magnets and non-magnetic spacers having different interior diameters forming a ribbed structure through which the hydraulic fluid passes. The method also includes energizing the magnets to attract particles into corners formed by the magnets and non-magnetic spacers.

BRIEF DESCRIPTION OF THE DRAWINGS

Embodiments of sequential steam injection and production completions are described with reference to the following figures. The same numbers are used throughout the figures to reference like features and components. It is emphasized that, in accordance with standard practice in the industry, various features are not necessarily drawn to scale. In fact, the dimensions of various features may be arbitrarily increased or reduced for clarity of discussion.

DETAILED DESCRIPTION

Figure 1:
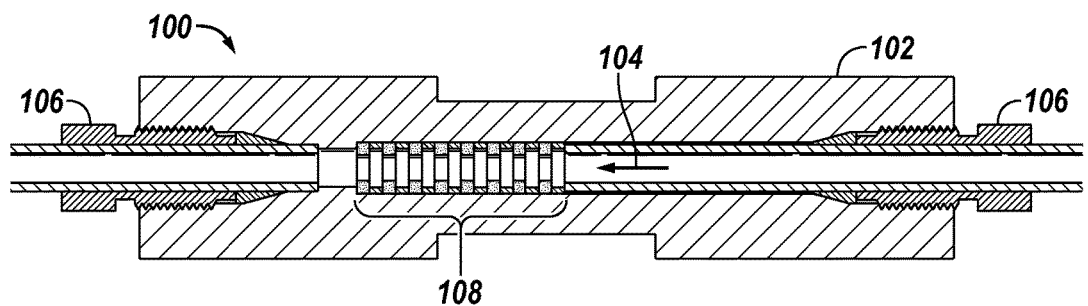
FIG. 1 is a cross-sectional view of an in-line particle filter assembly according to embodiments of the present disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

As used herein, the terms "connect," "connection," "connected," "in connection with," and "connecting" are used to mean "in direct connection with" or "in connection with via one or more elements"; and the term "set" is used to mean "one element" or "more than one element". Further, the terms "couple," "coupling," "coupled," "coupled together," and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point as the surface from which drilling operations are initiated as being the top point and the total depth being the lowest point, wherein the well (e.g., wellbore, borehole) is vertical, horizontal or slanted relative to the surface.

Hydraulic systems' reliability is highly sensitive to the level of contamination found inside the hydraulic oil that operates such system. Polluted hydraulic oil, in particular with metallic particles can bring down the entire system's reliability by increasing the rate of failure due to: galling, excessive wear, leakage, clogging, etc.

The pollution of the hydraulic fluid can come from the manufacturing, the assembly and test phases, the maintenance phases, but also from normal setup and retrieval, installation deployment, and wear during operation. It is often necessary to have these systems cleaned and flushed prior to putting them into service. However, even an initially clean system will most likely not remain clean for long due to wear, thereby generating particles during rig-up, running in hole and operation as well as degradation of the quality of the oil, depending on time and temperature. To avoid having these particles deteriorating the system and ultimately causing it to fail, filters may be implemented inside hydraulic circuitry upstream of sensitive components to avoid these particles from migrating within the hydraulic system. Conventional filters (e.g. mesh, screen or sintered filters) have the potential for clogging after some time and may require maintenance (cleaning or replacement). This may be a concern for oilfield equipment that is permanently installed in the wellbore which must be operable for durations over 10 or 20 years without maintenance, such as Completions products, i.e., hydraulically controlled safety valves, production or injection flow control valves, packers, tubing hangers, etc.

FIG. 1 is a cross-sectional view of an in-line particle filter assembly 100 according to embodiments of the present disclosure. The filter assembly 100 includes a filter housing 102 surrounding a portion of a hydraulic line 104. At each end of the filter housing 102 is a hydraulic connector 106 which facilitates connections between the filter assembly 100 and the hydraulic line 102. The assembly 100 also includes a filter array 108 within the filter housing 102 and surrounding a portion of the hydraulic line 104. The filter array 108 filters particles from the hydraulic fluid in the hydraulic line 104 as described herein in further detail below. The flow of hydraulic fluid can move in both directions through the filter assembly 100; however, for ease of explanation the flow is assumed to move from left to right unless otherwise noted.

Figure 2:
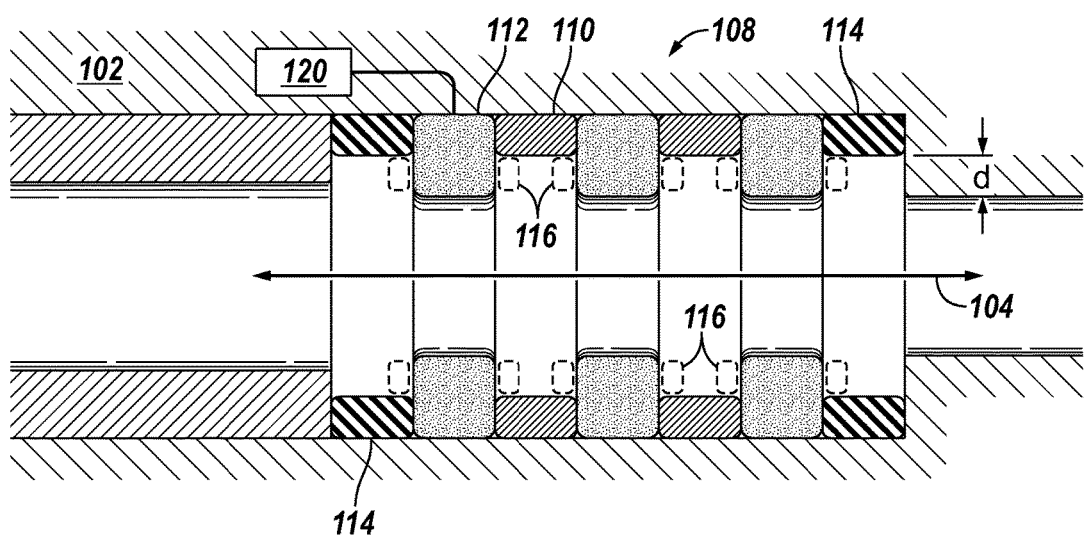
FIG. 2 is a cross-sectional view of the filter array according to embodiments of the present disclosure.

FIG. 2 is a cross-sectional view of the filter array 108 according to embodiments of the present disclosure. The filter array 108 includes a series of alternating spacers 110 and magnets 112. The spacers 110 can be washers or an equivalent device. At each end of the array is a compliant washer 114 which is at least partially resilient to allow for a degree of flexure to prevent shattering of potentially brittle components and to mitigate other failure modes. The compliant washer 114 can be placed within the array instead of at the end. The embodiment pictured in FIG. 2 has three magnets, two spacers, and two compliant washers; however, in other embodiments the number of magnets, washers, and compliant washers can vary. The spacers 110, magnets 112, and compliant washers 114 are generally cylindrical, but other shapes are considered as well. The interior diameter of the magnets 112 is smaller than the interior diameter of the spacers 110 by a dimension labeled "d" in FIG. 2. This dimension can vary as needed for a particular application. The compliant washers 114 have the same dimension as the spacers 110, but it may have a different dimension. The difference in dimension creates a ribbed interior surface that, when coupled with a magnetic field applied through the magnets, creates a trap for particles in the hydraulic fluid flow. The external diameter of the magnets 112 and washers may be the same. The magnets 112 and spacers 110 form corners 116 in which magnetic particles and other types of debris accumulates. The magnets 112 face each other with opposite polarity. The spacers 110 can be made out of a non-magnetic material to prevent the magnetic field being captured and weakened by the spacers 110.

In an example, the magnets 112 and spacers 110 have a ¼" outer diameter. The magnets 112 have a ⅛" inner diameter and the spacers 110 have a 3/16" inner diameter. The control line 104 can have a ¼" diameter. Other sizes and proportions are equally effective. In an alternate embodiment, the magnets 112 can have a larger inner diameter than the spacers 110. The magnets 112 can be natural magnets, or they can be electro magnets powered by a battery 120 or other suitable power source.

Figure 3:
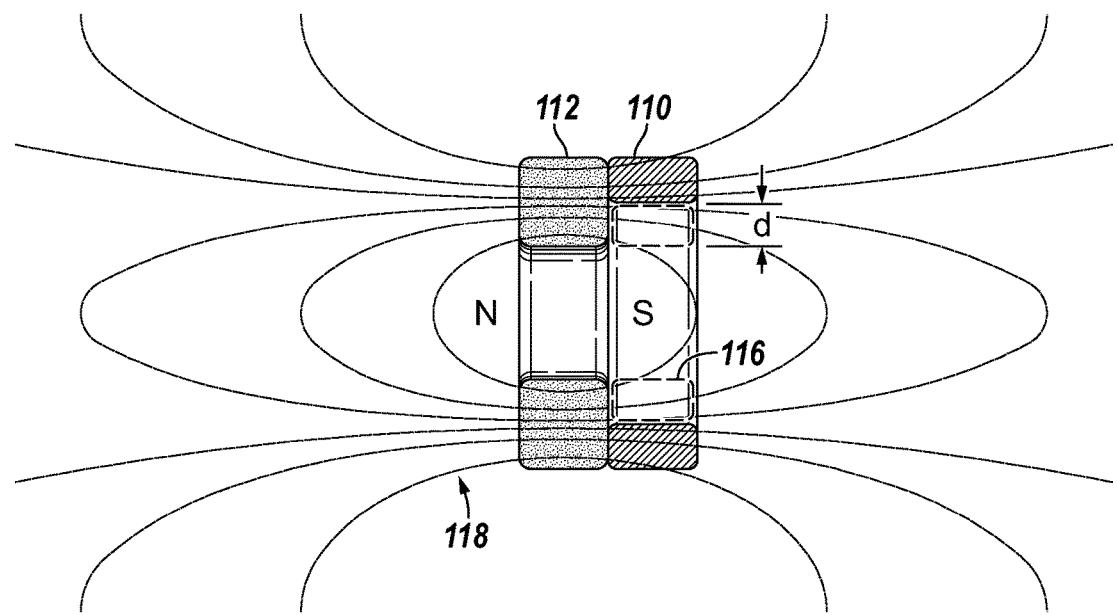
FIG. 3 is a schematic diagram of a magnetic field generated by the spacers and magnets according to embodiments of the present disclosure.

FIG. 3 is a schematic diagram of a magnetic field 118 generated by the spacers 110 and magnets 112 according to embodiments of the present disclosure. FIG. 3 shows a single magnet 112 and spacer 110 pair. In different embodiments there can be any number of magnets 112 and spacers 110. The axial dimension, or thickness, of the magnets 112 and spacers 110 can vary also. In some embodiments the magnets 112 and spacers 110 are 1/16" thick. In other embodiments, however, they can be thicker or thinner, and in some embodiments the magnets 112 are thinner or thicker than the spacers 110.

Figure 4:
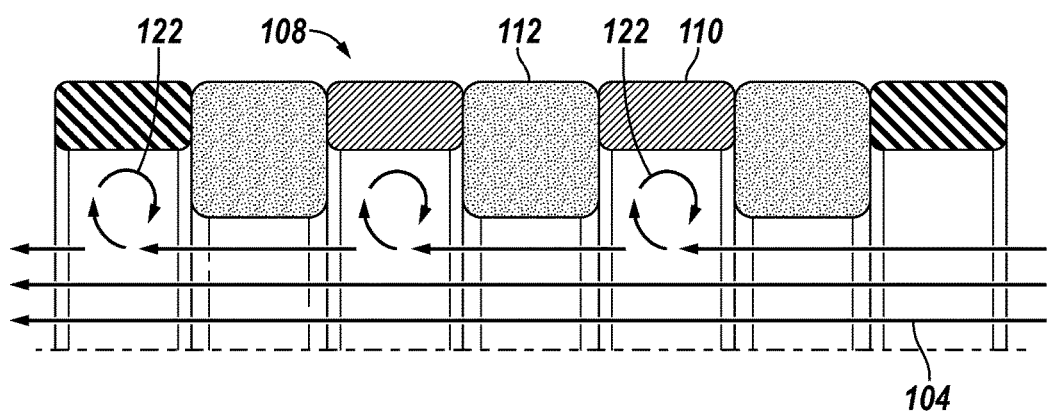
FIG. 4 is a cross-sectional diagram showing fluid flow paths within the filter array of the present disclosure.

FIG. 4 is a cross-sectional diagram showing fluid flow paths within the filter array 108 of the present disclosure. The ribbed internal surface causes an eddy flow shown by arrows 122. The magnetic field is strong within the eddy current region, trapping many magnetic particles and other debris, causing the particles, magnetic and otherwise, to become trapped within the filter array 108 and thereby eliminated from the flow line 104.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

What is claimed is:

1. A particle filter for a hydraulic control line, comprising:
a conduit for the hydraulic control line configured to permit hydraulic fluid to flow through the conduit;
a filter array having alternating magnets and spacers, wherein the magnets create a magnetic field within the conduit that attracts particles toward the magnets to trap the particles against the filter array, and wherein the magnets have an interior diameter and the spacers have an interior diameter larger than that interior diameter of the magnets.

2. The particle filter of claim 1, further comprising a filter housing surrounding the filter array and sealing against the conduit above and below the filter array.

3. The particle filter of claim 1, further comprising a resilient member adjacent the filter array and configured to urge the magnets and spacers together in a direction generally parallel with the fluid flow in the conduit.

4. The particle filter of claim 1 wherein the magnets are natural magnets.

5. The particle filter of claim 1 wherein the magnets are electromagnets powered by a power source.

6. The particle filter of claim 1 wherein the hydraulic control line is a ¼ inch diameter line for use in a downhole tool, the inner diameter of the magnets is ⅛", the inner diameter of the spacers is 3/16".

7. The particle filter of claim 1 wherein the spacers are made of a non-magnetic material.

8. The particle filter of claim 1 wherein the magnets and spacers have substantially the same axial thickness as measured in a direction parallel to the fluid flow.

9. The particle filter of claim 1 wherein the two or more of the magnets face each other with opposite polarity.

10. The particle filter of claim 1 wherein the magnets and spacers are ring-shaped surrounding the conduit.

11. The particle filter of claim 1 wherein the magnets' poles are oriented generally parallel to the direction of fluid flow along the conduit.

12. A magnetic particle filter assembly for use with a downhole tool, the magnetic particle filter assembly comprising:
   a filter housing configured to house a hydraulic control line, wherein the hydraulic control line is operably coupled to operate the downhole tool with selective application of hydraulic pressure;
   a filter assembly within the filter housing and surrounding a portion of the hydraulic control line, the filter assembly comprising:
      a plurality of magnets having a first interior diameter through which the hydraulic control line passes;
      a plurality of spacers having a second interior diameter through which the hydraulic control line passes, the second interior diameter being different than the first interior diameter, wherein the spacers and magnets are spaced alternatingly to create a ribbed interior surface to the filter assembly; and
      a resilient shock-absorbing member configured to resiliently urge the magnets and spacers together and to absorb shock to the magnets and spacers, wherein the filter assembly is configured to magnetically attract particles in the hydraulic control line and trap the particles against the filter assembly thereby preventing the particles from exiting the filter assembly.

13. The magnetic particle filter of claim 12 wherein the first interior diameter is smaller than the second interior diameter.

14. The magnetic particle filter of claim 12, further comprising a power source providing power to the magnets.

15. The magnetic particle filter of claim 12 wherein the resilient shock-absorbing member comprises two resilient shock-absorbing members, one placed at each extreme of the magnets and spacers.

16. The magnetic particle filter of claim 12 wherein adjacent magnets and spacers form corners at substantially right angles to capture the particles.

17. A method of filtering particles from a hydraulic fluid in a control line, the method comprising:
   positioning a filter array relative to the hydraulic fluid control line such that the hydraulic fluid passes through the filter array, wherein the filter array comprises alternating magnets and non-magnetic spacers, wherein the magnets and non-magnetic spacers have different interior diameters forming a ribbed structure through which the hydraulic fluid control line passes; and energizing the magnets to attract particles into corners formed by the magnets and non-magnetic spacers.

18. The method of claim 17, wherein the hydraulic fluid control line operates a downhole tool.

19. A particle filter for a hydraulic control line, comprising:
   a conduit for the hydraulic control line configured to permit hydraulic fluid to flow through the conduit;
   a filter array having alternating magnets and spacers, wherein the magnets create a magnetic field within the conduit that attracts particles toward the magnets to trap the particles against the filter array, and wherein the magnets have an interior diameter and the spacers have an interior diameter smaller than that interior diameter of the magnets.

20. The particle filter of claim 19, further comprising:
   a filter housing surrounding the filter array and sealing against the conduit above and below the filter array; and
   a resilient member adjacent the filter array and configured to urge the magnets and spacers together in a direction generally parallel with the fluid flow in the conduit.

* * * * *